United States Patent [19]

Pannell

[11] Patent Number: 4,457,630
[45] Date of Patent: Jul. 3, 1984

[54] COMPOST PROCESSING MACHINE

[75] Inventor: Robert T. Pannell, Kennett Square, Pa.

[73] Assignee: Pannell Manufacturing Corp., Avondale, Pa.

[21] Appl. No.: 277,270

[22] Filed: Jun. 25, 1981

[51] Int. Cl.³ .............................................. B01F 15/02
[52] U.S. Cl. .................................... 366/345; 56/16.4; 56/13.4
[58] Field of Search ............... 366/345, 346, 325, 326, 366/327, 329; 241/101.7, 101.6, 101.5; 422/273; 56/345, 16.4, 341, 13.4, 192, 364

[56] References Cited

U.S. PATENT DOCUMENTS

| | | | |
|---|---|---|---|
| 3,369,797 | 2/1968 | Cobey | 366/327 |
| 3,776,528 | 12/1973 | Toto | 366/345 |
| 3,791,593 | 2/1974 | Griftin | 239/667 |
| 3,856,276 | 12/1974 | Pannell | 366/345 |
| 4,019,723 | 4/1977 | Urbanczyk | 366/345 |

Primary Examiner—Robert W. Jenkins
Attorney, Agent, or Firm—Connolly and Hutz

[57] ABSTRACT

A compost processing machine for separating, mixing and stacking compost includes a pick-up drum at its forward end which picks up the compost and discharges it to feed means which in turn feeds the compost to a beater drum at the back end of the machine with the feed means and beater drum being formed in three distinct sections so as to provide a staggered type of feeding from the feed means to the beater drum and then a staggered type of discharge from the beater drum to the pile of compost being formed therefrom.

45 Claims, 10 Drawing Figures

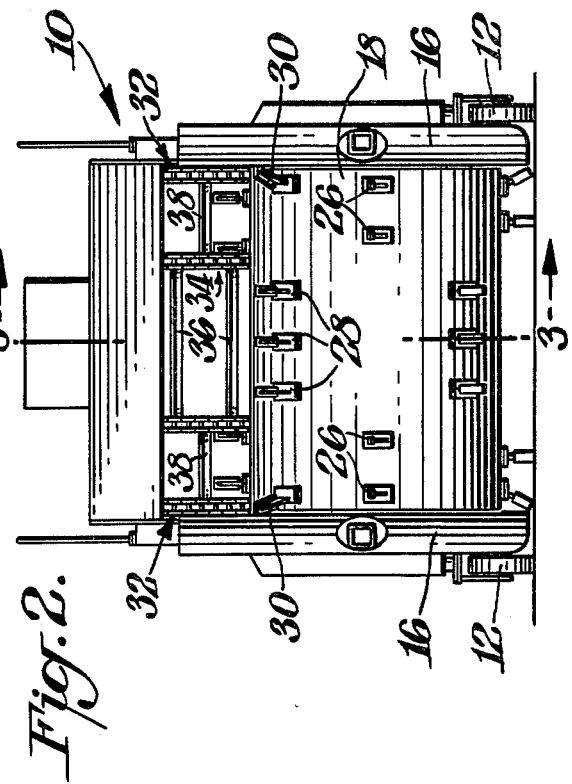
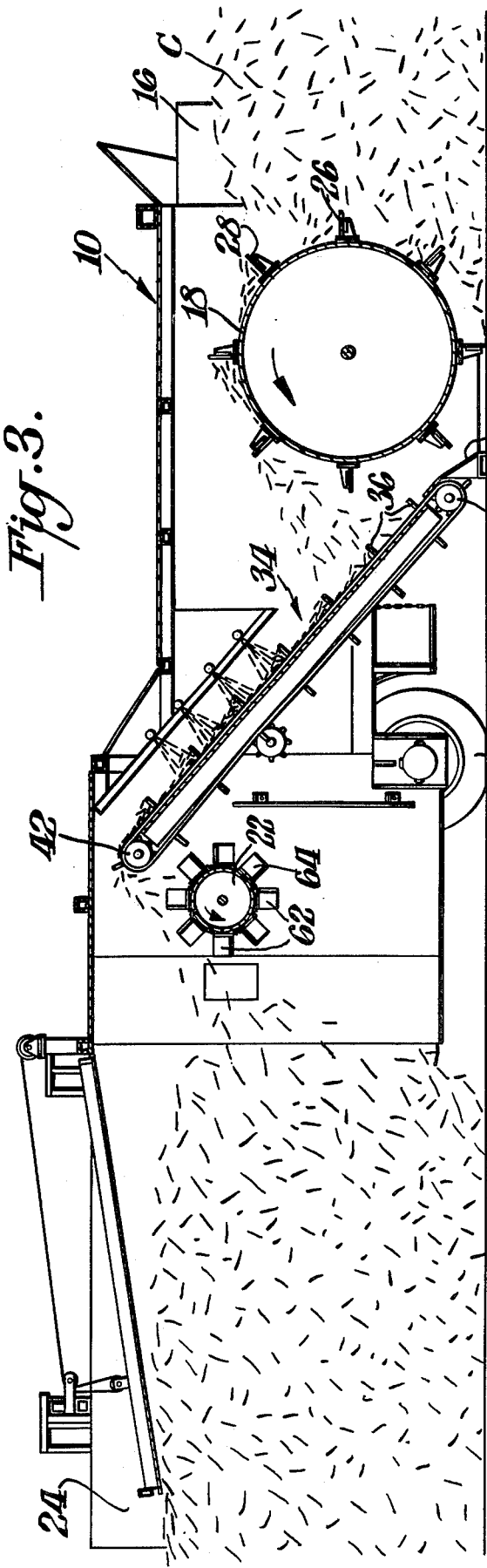
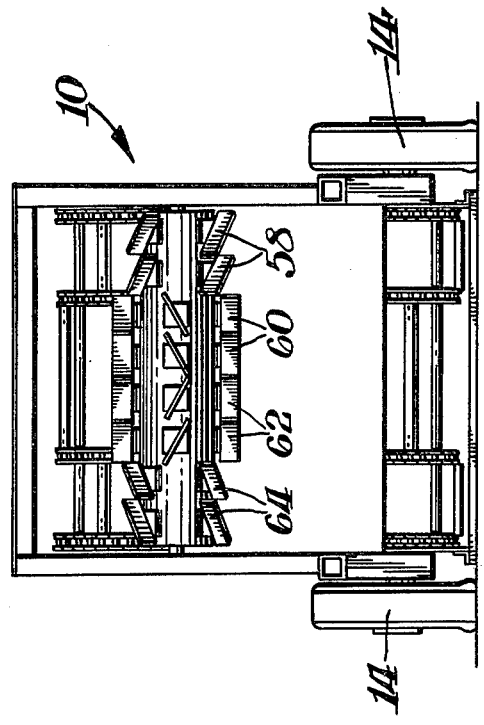

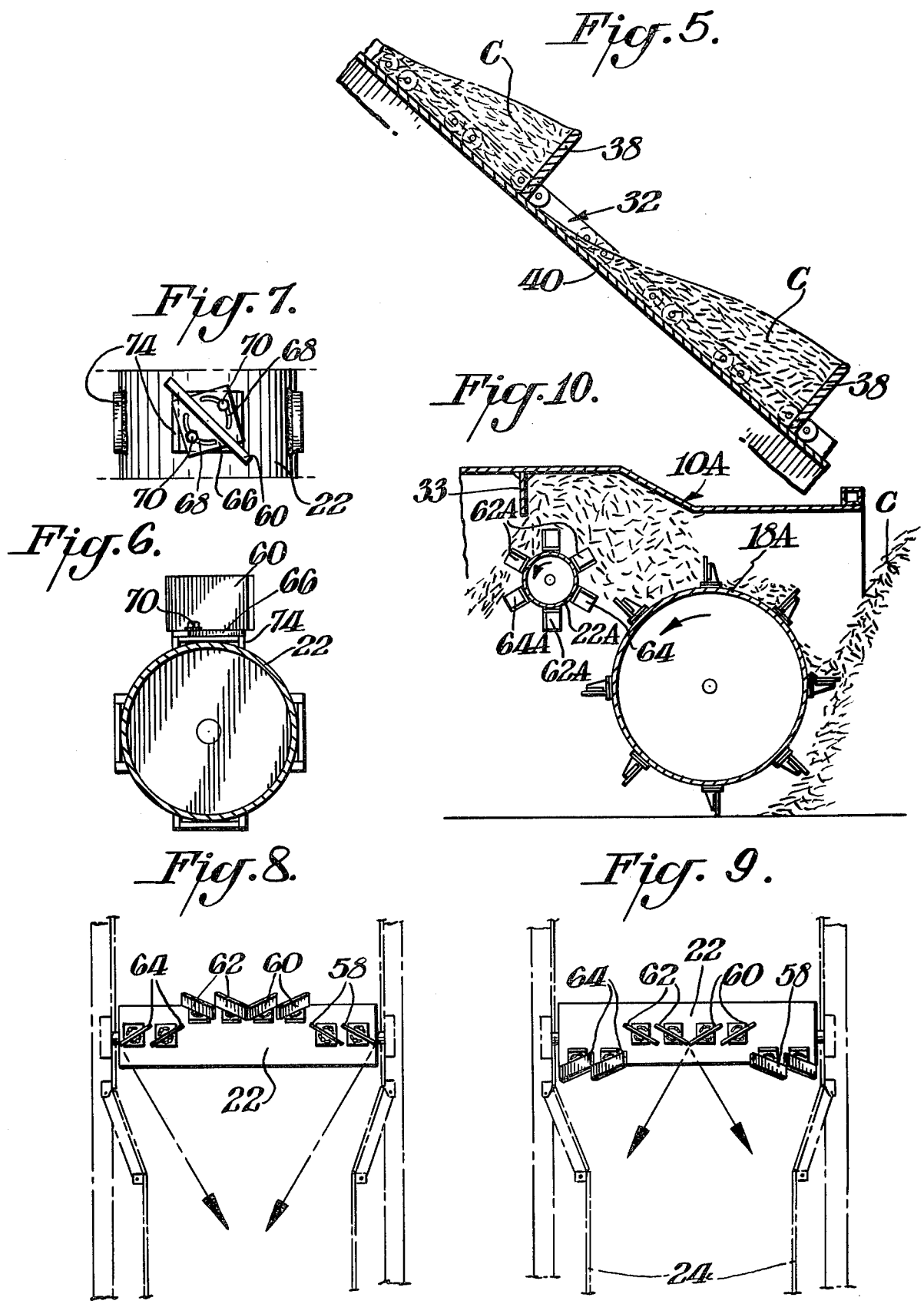

COMPOST PROCESSING MACHINE

BACKGROUND OF INVENTION

Various forms of compost processing machines have been known and used in the art. In general such machines include a pick-up device at the front end of the machine which picks up the compost and discharges it at the back end where it is received by a beater which is used in connection with pile forming means for forming a compost pile. Originally such machines had included pick-up means in the form of conveyors or endless belts which had the advantage of providing for better aeration and for better watering of the compost. Later machines, however, substituted a pick-up drum for the conveyors wherein the drum was slowly rotated compared to the faster rotating beaters. In general such machines threw the compost directly backwards in forming the compost pile. Variations have also included spreading or increasing the area over which the compost was thrown by throwing the compost toward the sides of the machine as well as directly backwards.

Attempts have been made in the prior art to form improved compost piles providing a cross-mixing action which desirably would include throwing the compost from the sides of the beaters toward the center of the pile and conversely throwing the compost from the center of the beater toward the sides of the pile. With such cross-mixing action, however, collisions occur with the compost because of the two opposite actions.

SUMMARY OF INVENTION

An object of this invention is to provide an improved compost processing machine which provides a better pile control.

A further object of this invention is to provide such a compost processing machine which can effectively cross-mix the compost while minimizing the chances of collision.

A still further object of this invention is to provide such a compost processing machine which is capable of varying the type of compost discharge under circumstances where cross-mixing is not desired.

In accordance with this invention, the compost processing machine includes pick-up means at its front end which discharges the compost onto feed means. The feed means includes a central feed section for feeding the compost to an intermediate portion of the beater means and also includes a side feed section on each side of the central feed section for feeding compost to the side portions of the beater means. The beater means is arranged so that, when desired, the compost fed to the side sections of the beater means is discharged toward the center, and conversely, the compost fed to the intermediate section is discharged toward the sides in forming the pile. The possibility of collision is minimized by staggering the feed of the compost from the central section of the feed means as compared to the side sections and in turn a staggered discharge results from the corresponding sections of the beater means.

In accordance with a preferred practice of this invention, the feed section comprises a plurality of endless belts having a common drive with flights being arranged between a central set of belts disposed between the flights located between side sets of belts. The beater means may comprise a single drum having adjustable diverter plates which can be adjusted so that the plates at each side section can be angled to throw the compost toward the center and conversely so that plates in the intermediate section can be angled to throw the compost toward the sides. The plates in the intermediate section would be mounted peripherally between sets of plates in the side sections.

In accordance with a further preferred practice of this invention the pick-up means is a slowly rotating drum having pick-up teeth arranged in a staggered manner at the sides of the drum as compared to the central portion of the drum to correspond with the staggered arrangement of the flights and diverter plates on the feed conveyors and beater drum, respectively.

THE DRAWINGS

FIG. 2 is a front elevation view of the machine shown in FIG. 1;

FIG. 3 is a cross-sectional view in elevation taken through FIG. 2 along the line 3—3;

FIG. 4 is a rear elevation view of the machine shown in FIGS. 1–3;

FIG. 5 is a cross-sectional view in elevation taken through FIG. 1 along the line 5—5;

FIG. 6 is a cross-sectional view in elevation of the beater drum used in the machine shown in FIGS. 1–5;

FIG. 7 is a plan view of the portion of the beater shown in FIG. 6;

FIG. 8 is a schematic plan view illustrating the deflection of the compost toward the center in a cross-mixing action utilizing the machine of FIGS. 1–8;

FIG. 9 is a view similar to FIG. 8 schematically showing deflection of the compost toward the sides; and FIG. 10 is a view similar to FIG. 3 schematically showing an alternative arrangement of this invention.

DETAILED DESCRIPTION

Figure 1:
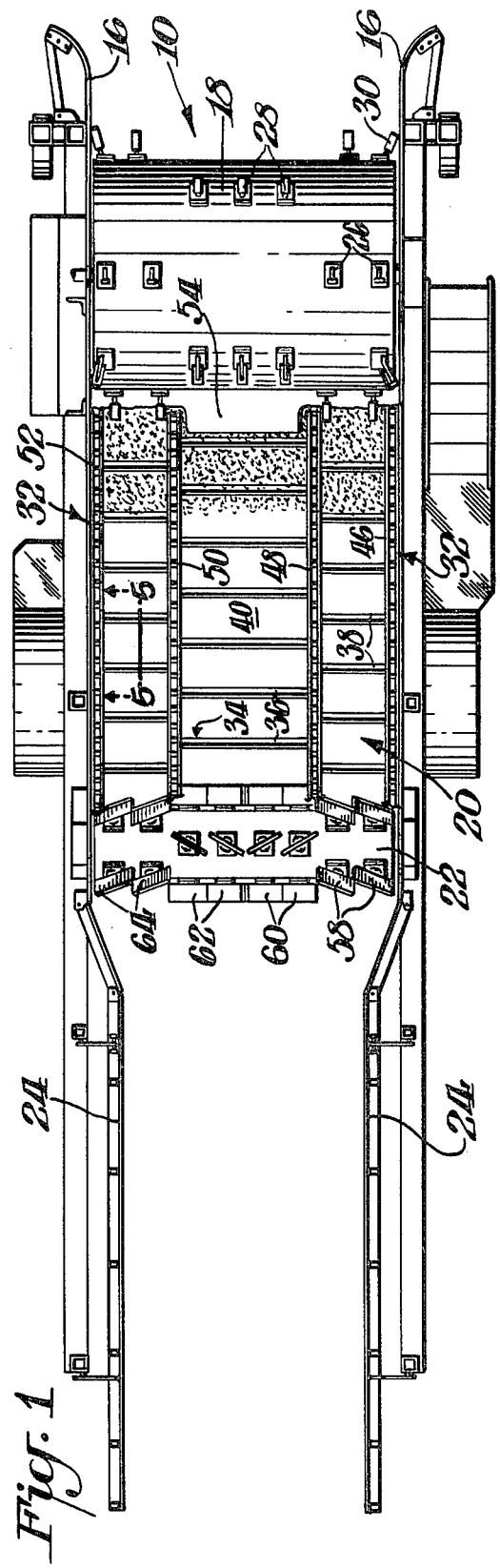
FIG. 1 is a cross-sectional side view in elevation of a compost processing machine in accordance with this invention.

FIGS. 1–4 show a compost processing machine 10 in accordance with this invention for separating, mixing and stacking compost. In general machine 10 operates similar to the machine illustrated and described in U.S. Pat. No. 3,856,276, the details of which are incorporated herein by reference thereto. In general machine 10 includes a main frame in the form of an inverted U mounted on a set of front wheels 12 and a set of rear wheels 14. Machine 10 is driven as described in the aforenoted patent by powering rear wheels 14 in a suitable manner so that machine 10 is driven to one end of the pile of compost C with the machine aligned with the direction of the pile. Receiver panels 16, 16 at the front end of machine 10 are adjusted to envelop the pile. As the machine moves forward over the pile of compost, the compost is picked up by pick-up drum 18 which then throws the compost backward onto the feed conveyors 20 which in turn discharge the compost onto beater or mixing drum 22. Beater drum 22 then throws the compost rearwardly to form the compost pile. Machine 10 includes stacking gates 24, 24 as described in the aforenoted patent for controlling the width of the processed compost pile.

Compost processing machine 10 is particularly designed for effective cross mixing with minimal collision of compost. Machine 10, however, is not limited to forming piles for cross mixing but has the capability of forming various types of piles. Machine 10 is particularly designed to accomplish its objects by staggering the feed of the compost as it moves through the various sections of the machine, namely the pick-up section, the feed section and the beater section.

FIGS. 1-2 show details of pick-up drum 18 which is particularly designed to achieve the staggered feed. As indicated therein, drum 18 may be considered as being formed in three sections, namely a pair of side sections of equal width and an intermediate section of twice the width as each side section. Each side section includes pick-up teeth 26 which are generally aligned with the pick-up teeth 26 of the opposite side section. Teeth 26 may be of any suitable construction such as disclosed in the aforementioned patent. The intermediate section of drum 18 likewise includes teeth 28 which, however, are disposed in a staggered relationship with respect to side teeth 26. In this manner, compost is alternately picked up by teeth 26 and teeth 28 rather than being picked up by drum 18 uniformly across the width of drum 18. Drum 18 further includes spaced teeth 30 along the end margins thereof which are canted outwardly as illustrated to prevent side accumulation of compost. Thus, teeth 30 function as side clean-up means.

FIG. 3 illustrates the compost picked-up by drum 18 to then be discharged backwardly onto feed means or conveyors 20. As shown in FIGS. 2 and 4, feed means 20 is likewise formed in three sections comprising side conveyors 32, 32 and central conveyor 34. The individual conveyors are in the form of endless belts having flights thereacross with the flights arranged in a staggered manner so that the flights 36 in the central feed section 34 are disposed between flights 38 of the side feed sections 32. A solid plate or support 40 (FIG. 5) is located beneath the upper runs of the various conveyors to prevent compost from falling therethrough. As shown in FIG. 5, the compost which is thrown rearwardly by drum 18 tends to fall down each conveyor and is accumulated by an upstanding flight member. Because of the staggered arrangement of flights, piles of compost would be disposed at spaced locations on conveyor 34 between corresponding piles of compost on side conveyors 32, 32. Conveyors 32, 32, 34 are dimensioned to correspond to the side and intermediate sections of pick-up drum 18. In other words, side conveyors 32, 32 are of equal width and intermediate conveyor 34 is twice the width of each side conveyor 32, 32.

As shown in FIGS. 1 and 3, the individual conveyors 32, 32, 34 are in the form of chains having a common drive in that all of the chains are mounted on teeth of sprockets 42, 44, one of which would be a driven shaft. Advantageously the various feed sections are formed by providing four individual endless chains 46, 48, 50, 52 (FIG. 1) wherein flights 38 of one side feed section are connected across chains 46 and 48 while the flights of the other side section are connected across chains 50, 52 with the flights 38 being in line with each other. Flights 36 in turn are connected across chains 48 and 50. The utilization of a common drive for the various conveyors is not only advantageous in minimizing the number of parts but also assures that the desired staggered feed of the compost to the beater means will be achieved.

FIGS. 1 and 3 show another feature of this invention wherein a scraper plate 54 is located at the lower end of conveyor 20 juxtaposed sprocket 44. Plate 54 extends completely across the machine and is located beneath pick-up drum 18. (For the sake of clarity, FIG. 1 illustrates plate 54 to be broken away.) Plate 54 prevents leaked material from being discharged to the beater means and such material would later be picked up by pick-up drum 18. An access door (not shown) 5 on the outer wall of the machine to provide access to scraper plate 54.

Machine 10 includes beater means designed to discharge the compost into the pile in a staggered manner whereby the compost may be cross mixed by discharging the compost from the sides toward the center and from the center toward the sides but the collision is minimized by having a staggered type of discharge. The staggered discharge is likewise accomplished by providing individual side and central sections. Such individual sections may be in the form of discrete elements. In the preferred practice of the invention, the individual sections are sections of a single drum 22.

As shown in FIG. 3, beater drum 22 is a horizontal rotatable drum mounted below and at the discharge end of the feed means 20. Drum 22 includes a plurality of diverter plates 58, 60, 62, 64. As shown in FIGS. 4 and 8-9, plates 58 are mounted in one side section of beater drum 22 and plates 64 are mounted in the opposite side section of beater drum 22. The intermediate section, which is twice as wide as each side section, has its plates 60, 62 mounted thereon.

In one practice of the invention, sets of side plates are mounted 90° around the periphery of drum 22 thus resulting in four sets of each side plates and four sets of intermediate plates. The invention, however, may also be practiced with one, two or three or any suitable number of sets of plates.

FIGS. 6-7 illustrate the mounting of an individual plate 60 on beater drum 22. As indicated therein, plate 60 is of rectangular form and is secured in any suitable manner to base member 66. Base member 66 in turn is formed with a pair of arcuate slots 68, 68 through which a suitable fastening member such as bolts 70, 70 extend into plate 74 fixedly mounted in any suitable manner to beater drum 22. This type of mounting permits the angular orientation of each diverter plate to be adjusted so that all of the plates may be aligned parallel to the axis of drum 22, or the plates may be angled to divert the compost toward the right or toward the left. Where cross mixing of the inside-out and outside-in type is desired, plates 58 and 64 are angled to direct the compost toward the center while plates 60 and 62 are angled opposite each other to direct the compost toward the sides. FIG. 8, for example, illustrates the pattern achieved when the compost is being discharged by plates 58, 64 toward the center. FIG. 9 illustrates the pattern when compost is discharged from plates 60, 62 toward the sides. Since the compost is discharged from the various side plates in a staggered manner with respect to the central plates, the possibility of collision is minimized.

As is readily apparent, if desired, the plates can be adjusted to achieve a wide variety of different type piles including piles wherein more compost is at the center or where more compost is at the sides or where the compost is thrown directly rearwardly without any divergence. For example, if a pile is desired which has tight sides and a loose center, more compost would be thrown at the sides, and this would be achieved by angling the various diverter plates to accomplish this result.

As can be appreciated, the provision of the adjustable diverter plates on beater drum 22 represents a distinct improvement of the invention. Thus it is possible to orient the diverter plates in various positions with respect to the beater drum axis. As noted, if the diverter plates are located in alignment with each other and parallel to the drum axis, the compost will be thrown in a straight back direction. By adjustably mounting the diverter plates on the beater drum, however, it is possible to mount the diverter plates in different orientations out of alignment with each other at an angle to the drum axis whereby the compost would be angularly thrown by the diverter plates. Machine 10 thus affords a user with the possibility of forming a selective type of pile by arranging the diverter plates in one angular orientation during one period of use of the machine, and later, when the machine is to be used again the user, if desired, may change the angular orientation of the diverter plates so as to form a different type of pile. Along with this wide range of types of pile wherein the compost is angularly thrown by the diverter plates, the user also has the option of forming a pile by throwing the compost straight back if no cross mixing or angular throwing is desired.

In order to control shreading of the compost, the speed of pick-up drum 18 would be controlled. In a practice of this invention, the conveyors and pick-up drum would rotate more slowly (such as 40 rpm) than the rotation of beater drum 22 which could be about 300-600 rpm. The conveyor should be rotated fast enough to prevent a uniform accumulation of compost completely across feed section 20. In other words, the side of feed sections should accumulate compost at locations intermediate the central feed section so that staggered discharge would result.

Although the invention has been described in detail with respect to the preferred embodiment which includes conveyor belts having a staggered arrangement of flights for feeding the compost from the pick-up drum to the beater drum, the concepts of this invention are not limited to that practice. In this respect, the provision of a beater drum having an offset or staggered arrangement of diverter plates itself represents a novel aspect of this invention which is a marked improvement and distinguishes from the prior art. Accordingly, it is possible to broadly practice the invention wherein such a beater drum is used and wherein the compost fed to the beater drum is fed by conveyor belt means with the flights extending completely across the conveyor belts rather than having the flights arranged in the illustrated staggered or offset manner. FIG. 10 represents a further variation of this invention wherein the conveyor belts are completely omitted and the compost is fed from the pick-up drum 18A directly back to the beater drum 22A which includes the novel arrangement of diverter plates with central diverter plates 62A and side diverter plates 64A being illustrated in FIG. 10. In the arrangement shown in FIG. 11, a baffle 33 is located above beater drum 32A so as to direct compost upwardly from pick-up drum 32A down toward beater drum 22A.

The present invention thus provides a compost processing machine which is capable of minimizing shreading, effectively aerating and spraying the compost on the conveyors as well as effectively forming the desired type of pile. All of this is achieved in a simple manner while maximizing the ability of pile control so that more homogenized blending is achieved by knitting the compost together.

What is claimed is:

1. A compost processing machine for separating, mixing and stacking compost, said machine having a front end and a back end and being movably mounted, pick-up means at said front end for picking up compost and discharging the compost toward said back end, beater means at said back end, said beater means being capable of cross-mixing the compost fed to said beater means, feed means between said pick-up means and said beater means for receiving the compost discharged from said pick-up means and feeding the compost to said beater means, said feed means including a central feed section for feeding compost to an intermediate portion of said beater means, said feed means including a side feed section on each side of said central feed section for feeding compost to the side portions of said beater means, and said central feed section and said side feed sections being mounted for feeding the compost to said beater means in a staggered manner with said central feed section feeding the compost at time periods intermediate the time periods when said side feed sections feed the compost.

2. The machine of claim 1 wherein said feed means comprises a plurality of endless belts defining said central feed section between a central set of belts and further defining said side feed sections between side sets of belts with flights extending across each set of belts, and said flights located in said central feed section being longitudinally displaced with respect to said flights in said side feed section so as to be intermediate the distance between adjacent flights of said side feed sections.

3. The machine of claim 2 including plate means located beneath and in contact with said belts.

4. The machine of claim 3 wherein said plurality of belts comprises four belts and a common drive for simultaneously driving all of said belts.

5. The machine of claim 4 wherein said beater means comprises a horizontal rotatable drum mounted below and at the discharge end of said feed means, a plurality of diverter plates secured to said drum, said diverter plates including sets of diverter plates on the central portion of said drum for receiving the compost fed by said central feed section, and sets of diverter plates at each side portion of said drum intermediate said sets of central portion diverter plates for receiving the compost fed by said side feed sections.

6. The machine of claim 5 wherein said diverter plates are adjustably mounted for controlling the angular orientation of said diverter plates with respect to said drum.

7. The machine of claim 6 wherein four sets of said diverter plates are provided for each of said central portion and said side portions.

8. The machine of claim 6 wherein three sets of said diverter plates are provided for each of said central portion and said side portions.

9. The machine of claim 6 wherein said pick-up means includes a rotatable pick-up drum, sets of pick-up teeth being provided on the central portion of said pick-up drum for delivering compost to said central feed section of said feed means and sets of pick-up teeth on the side portions of said pick-up drum intermediate said pick-up teeth on said central portion of said pick-up drum for delivering compost to said side feed sections of said feed means.

10. The machine of claim 9 including accumulation preventing teeth mounted on said pick-up drum at the ends thereof.

11. The machine of claim 9 including scraper means mounted at the lower end of said feed means below said pick-up drum and completely across said pick-up drum.

12. The machine of claim 3 including scraper means at the lower end of said feed means below said pick-up means and extending completely across said pick-up means.

13. The machine of claim 1 wherein said beater means comprises a horizontal rotatable drum mounted below and at the discharge end of said feed means, a plurality of diverter plates secured to said drum, said diverter plates including sets of diverter plates on the central portion of said drum for receiving the compost fed by said central feed section, and sets of diverter plates at each side portion of said drum intermediate said sets of central portion diverter plates for receiving the compost fed by said side feed sections.

14. The machine of claim 13 wherein said diverter plates are adjustably mounted for controlling the angular orientation of said diverter plates with respect to said drum.

15. The machine of claim 14 wherein four sets of said diverter plates are provided for each of said central portion and said side portions.

16. The machine of claim 14 wherein three sets of said diverter plates are provided for each of said central portion and said side portions.

17. The machine of claim 14 wherein said pick-up means includes a rotatable pick-up drum, sets of pick-up teeth being provided on the central portion of said pick-up drum for delivering compost to said central feed section of said feed means and sets of pick-up teeth on the side portions of said pick-up drum intermediate said pick-up teeth on said central portion of said pick-up drum for delivering compost to said side feed sections of said feed means.

18. The machine of claim 17 including accumulation preventing teeth mounted on said pick-up drum at the ends thereof.

19. The machine of claim 1 including scraper means mounted at the lower end of said feed means below said pick-up means and completely across said pick-up means.

20. A compost processing machine for separating, mixing and stacking compost, said machine having a front end and a back end and being movably mounted, pick-up means at said front end for picking up compost and discharging the compost toward said back end, beater means at said back end, said beater means being capable of cross-mixing the compost fed to said beater means, said beater means comprising a horizontal rotatable drum mounted for receiving the compost discharged by said pick-up means, a plurality of diverter plates secured to said drum, said diverter plates including sets of diverter plates on the central portion of said drum, and sets of diverter plates at each side portion of said drum intermediate said sets of central portion diverter plates.

21. The machine of claim 20 wherein said diverter plates are adjustably mounted for controlling the angular orientation of said diverter plates with respect to said drum.

22. The machine of claim 20 including a baffle mounted above said drum for directing the compost from said pick-up means to said drum.

23. The machine of claim 20 including conveyor belt means between said pick-up means and said drum for directing the compost from said pick-up means to said drum.

24. The machine of claim 23 wherein said conveyor belt means includes flight means extending completely across the width thereof.

25. The machine of claim 23 wherein said conveyor belt means comprises a central set of belts located between side sets of belts with flights extending across each set of belts, and said flights located across said central set of belts being longitudinally displaced with respect to said flights located across said side sets of belts so as to be intermediate the distance between adjacent flights of said side sets of belts.

26. A method of processing compost comprising picking up compost by pick-up means at the front end of a compost processing machine and discharging the compost onto feed means in back of the pick-up means, feeding the compost from the feed means in a staggered manner to beater means in back of the feed means with compost being fed from a central portion of the feed means to an intermediate portion of the beater means at time intervals between the times during which the compost is fed from side portions of the feed means to side portions of the beater means.

27. The method of claim 26 including discharging the compost from the beater means at staggered time intervals wherein the compost is discharged from the intermediate portion of the beater means at time intervals between the discharging of the compost from the side portions of the beater means.

28. The method of claim 27 wherein the compost is cross-mixed by throwing the compost from the side portions of the beater means rearwardly toward the center and by throwing the compost from the intermediate portion of the beater means rearwardly toward the sides.

29. The method of claim 27 wherein the feed means is in the form of a plurality of conveyor belts having staggered flights across the central sets of conveyor belts with respect to the side sets of the conveyor belts and including the step of driving the conveyor belts from a common drive.

30. The method of claim 29 wherein the beater means comprises a single drum having sets of diverter plates in its intermediate portion peripherally mounted in a staggered manner with respect to sets of diverter plates at the side portions of the beater drum and including the steps of feeding the compost from the feed means to the diverter plates and then discharging the compost from the diverter plates rearwardly.

31. The method of claim 30 wherein the diverter plates are adjustably mounted and including the step of adjusting the diverter plates to be angularly oriented for cross mixing the compost.

32. The method of claim 31 wherein the pick-up means comprises a pick-up drum having staggered teeth thereon with sets of teeth in the intermediate portion of the drum being peripherally mounted between sets of teeth at the side portions of the drum and including the steps of slowly rotating the drum, picking up compost between the pick-up teeth, and throwing the compost from the pick-up teeth toward the feed means.

33. A method of selectively varying the type of compost pile formed resulting from the use of a compost processing machine which separates, mixes and stacks compost by feeding compost from pick-up means to a beater drum which has diverter plates for discharging the compost to form a pile therefrom and wherein the diverter plates are mounted in an angularly adjustable manner to the beater drum for selectively throwing the compost in a straight back direction when the diverter plates are adjusted in alignment with each other in a first orientation parallel to the drum axis and for selectively throwing the compost in an angular direction when the diverter plates are adjusted out of alignment with each other in a second orientation at an angle to the drum axis and for selectively throwing the compost in a different angular direction when the diverter plates are adjusted out of alignment with each other in a third orientation at an angle to the drum axis, said method including adjusting the diverter plates to one of said orientations, forming a pile of compost during one period of use of the machine while the diverter plates are in said one orientation, after the period of use then adjusting the diverter plates to another of said orientations, and forming a pile of compost during a further period of use of the machine while the diverter plates are in said another orientation.

34. In a compost processing machine, the improvement being beater means for cross-mixing the compost fed to said beater means, said beater means comprising a horizontal rotatable member, a plurality of diverter elements secured to said member, said diverter elements being arranged in three circumferential sections across said member, said sections comprising a central section at the central portion of said member and a side section at each side portion of said member, said diverter elements in said central section being arranged to direct to compost outwardly toward the sides of said machine, said diverter elements in said side sections being arranged to direct the compost inwardly toward the center of said machine, and said diverter elements in said side sections being peripherally linear offset with respect to said diverter elements in said central section whereby the compost directed by said side sections diverter elements is generally directed at a different time than the time which said central section diverter elements direct the compost.

35. The machine of claim 34 wherein each of said side sections includes a plurality of equally peripherally spaced sets of diverter elements, and said central section includes a same number of equally peripherally spaced sets of diverter elements.

36. The machine of claim 35 wherein at least three sets of diverter elements are provided in each of said side sections and said central section.

37. The machine of claim 34 wherein each of said side sections occupies a quarter of the axial length of said member, said central section occupying the central half of said member, and said central half of said member being divided into two equal portions each of which contains come of said diverter elements whereby said diverter elements in one of said portions directs compost to one side of said machine and said diverter elements in said other portion directs compost to the other side of said machine.

38. The machine of claim 34 wherein said rotatable member is a drum, and said diverter elements being plates.

39. The machine of claim 38 wherein said diverter plates are adjustably mounted for controlling the angular orientation of said diverter plates with respect to said drum.

40. In a compost processing machine for separating, mixing and stacking compost, said machine having a front end and a back end and being movably mounted, pick-up means at said front end for picking up compost and discharging the compost back toward said back end and beater means at said back end, the improvement being feed means between said pick-up means and said beater means for receiving the compost discharged from said pick-up means and feeding the compost to said beater means, and scraper means between said pick-up means and said feed means for facilitating compost material located downstream from and below said pick-up means to be picked up by said pick-up means and discharged to said feed means.

41. The machine of claim 40 wherein said feed means comprises inclined conveyor means having its lower end near said pick-up means and its upper end near said beater means, and said scraper means comprising an elongated plate extending above and across said lower end of said conveyor means and downwardly below said conveyor means toward said pick-up means.

42. The machine of claim 41 wherein said pick-up means comprises a drum having a plurality of spaced teeth, and said scraper plate extending below said drum.

43. The machine of claim 42 wherein said conveyor means includes a plurality of spaced endless members having flights therebetween, and said plate extending at least as far as the endmost of said members.

44. The machine of claim 43 wherein said machine includes an access door located in line with said scraper plate to provide access thereto.

45. In a compost processing machine, the improvement being means for cross-mixing the compost being processed, said means comprising a horizontal rotatable member comprising at least two continuous adjacent circumferential sections formed about the surface of said member, at least one diverter element in one of said sections angularly mounted to direct compost toward the general direction of the other section, at least one diverter element in said other section angularly mounted to direct compost toward the general direction of said one section, and said diverter element of said one section being mounted linearly offset from said diverter elements of said other section to provide a staggered mounting thereof whereby the compost is directed from said adjacent sections in a staggered time relationship.

* * * * *